(12) United States Patent
Gruber et al.

(10) Patent No.: US 9,282,603 B2
(45) Date of Patent: Mar. 8, 2016

(54) CURRENT SOURCE HAVING AN IMPROVED DIMMING DEVICE

(71) Applicant: exscitron GmbH, Chemnitz (DE)

(72) Inventors: Stephan Gruber, Chemnitz (DE); René Franzky, Chemnitz (DE); Winfried Beyer, Chemnitz (DE); Gerd Meyhöfer, Dresden (DE)

(73) Assignee: Exscitron GmbH, Chemnitz (DE)

( * ) Notice: Subject to any disclaimer, the term of this patent is extended or adjusted under 35 U.S.C. 154(b) by 51 days.

(21) Appl. No.: 14/035,466

(22) Filed: Sep. 24, 2013

(65) Prior Publication Data

US 2014/0084802 A1    Mar. 27, 2014

(30) Foreign Application Priority Data

Sep. 24, 2012    (DE) .......................... 10 2012 108 965

(51) Int. Cl.
*H05B 37/02*    (2006.01)
*H05B 33/08*    (2006.01)

(52) U.S. Cl.
CPC ........ *H05B 33/0815* (2013.01); *H05B 33/0824* (2013.01); *H05B 33/0866* (2013.01)

(58) Field of Classification Search
CPC ............... H05B 37/02; H05B 33/0815; H05B 33/0824; H05B 33/0845; H05B 33/0848; H05B 33/0866
USPC .......... 315/200 R, 201, 209 R, 210, 291, 294, 315/297, 307, 308, 312, 320, 361
See application file for complete search history.

(56) References Cited

U.S. PATENT DOCUMENTS

| 8,044,609 | B2 | 10/2011 | Liu | |
| 8,242,704 | B2 * | 8/2012 | Lethellier | ..................... 315/276 |
| 8,310,171 | B2 * | 11/2012 | Reisenauer et al. | .......... 315/287 |
| 2006/0255753 | A1 | 11/2006 | Sawada et al. | |

(Continued)

FOREIGN PATENT DOCUMENTS

| CN | 101681599 A | 3/2010 |
| CN | 101825910 A | 9/2010 |

(Continued)

OTHER PUBLICATIONS

European Search Report dated Feb. 10, 2015, issued in European Application No. EP 13 18 5268.

(Continued)

*Primary Examiner* — Jimmy Vu
(74) *Attorney, Agent, or Firm* — Carter, Deluca, Farrell & Schmidt LLP

(57) ABSTRACT

The invention relates to a dimmable, multi-channel voltage/current source (47) with several outputs (CH1, CH2) for connecting an electrical load (10, 20), which provides a regulated direct current (I1, I2) at every output (CH1, CH2). The voltage source (47) comprises, for every output (CH1, CH2), a first dimming device (3), with which part of the current (I1', I2") flowing to the output (CH1, CH2) can be conducted to a reference potential (GND) and which in each case comprises a switch (17, 27) that is controlled by a first PWM signal, and a second dimming device (4) with a second switch (12, 22) that is arranged in series to the electrical load (10, 20) and which is controlled by a second PWM signal (open1, open2).

19 Claims, 9 Drawing Sheets

(56) References Cited

U.S. PATENT DOCUMENTS

| | | |
|---|---|---|
| 2009/0015218 A1 | 1/2009 | O'Driscoll et al. |
| 2012/0098442 A1 | 4/2012 | Jin |
| 2012/0194078 A1* | 8/2012 | Ren et al. .................. 315/122 |
| 2012/0200229 A1 | 8/2012 | Kunst et al. |

FOREIGN PATENT DOCUMENTS

| | | |
|---|---|---|
| CN | 102256418 A | 11/2011 |
| DE | 102005056338 A1 | 5/2007 |
| DE | 102010048951 A1 | 7/2011 |
| DE | 102010031236 A1 | 6/2012 |

OTHER PUBLICATIONS

SIPO Search Report issued in Chinese Application No. 201304362454.

* cited by examiner

CURRENT SOURCE HAVING AN IMPROVED DIMMING DEVICE

BACKGROUND

The invention relates to a current source with multiple outputs for connecting an electrical load.

Regulated power supplies in the most varied of embodiments are known from the prior art, including dimmable embodiments, with which the output power can be set as desired. U.S. Pat. No. 7,659,673 B2 discloses e.g. a multi-channel current source for operating LED strings of various colours. Each of the LED strings has its own current regulator for regulating the current flowing through the particular string. Furthermore, a controllable switch that is controlled by means of a PWM signal, and with the aid of which the individual LED strings can be dimmed, is arranged in each of the LED strings.

Other DC current sources with multiple outputs are known from e.g. DE 10 2010 048 951 A1 by the applicant, from WO 2007/039862 A2 or EP 0 788 850 B1.

Dimmable DC current sources are often used for operating light systems that have many kinds of lights, in particular LEDs of different colours. By mixing the colours of the individual basic colours—in the RGB colour space these are red, green and blue—many visible colours can be displayed. To this end, it is necessary that the different outputs or channels of the DC current source may be dimmed independently of each other. As mentioned above, in the prior art there are a whole range of multi-channel DC current sources that have individually dimmable channels. However, with these current sources the problem emerges that, when the current in the individual channels increases or decreases, the colour location of the emitted light in the colour space also changes. The drifting of the colour location in the colour space is explained below by means of FIGS. 1a and 1b.

FIG. 1a shows a CIE normal chromaticity diagram that represents all colours that can be perceived by an observer. In the middle of the CIE chromaticity diagram, the light emitted by the three colour spotlights is perceived as white, as the three basic colours are mixed in approximately equal measures. The segment 80 represented at the top right of the white area is shown again enlarged in FIG. 1b.

In FIG. 1b, the colour location of a so-called XLamp, a special kind of LED from the Cree company, is shown depending on the current flowing through the LED. The operating current thereby lies between 175 mA and 2500 mA. As should be obvious, the colour location shifts with the current intensity and with it also the wavelength of the emitted light. Moreover, the colour temperature also shifts with the intensity of the constant current. Dimming of the LED therefore has the effect of changing the blue, red or green proportion of the emitted light, and the LED therefore has a perceptibly different colour tone depending on the dim setting. In a light system that is constructed in RGB technology, the constant current dimming of the LED effects a slight colour shift of the light perceived by the observer. This is undesirable for many applications.

From each of U.S. Pat. No. 8,044,609 B2, DE 10 2010 031 236 A1, US 2012/0200229 A1 and US 2006/0255753 A1 a current source with several outputs is known, which provides a constant current for operating an electrical load available on every output, wherein the individual outputs can be individually dimmed by means of a dedicated dimming device. If LEDs are connected to the outputs, however, dimming of the constant current again leads to a colour location shift of the light emitted by the LEDs.

SUMMARY

It is therefore an object of the present invention to create a multi-channel, dimmable constant current source, with which the various lamps, in particular LEDs, can be dimmed with as small a colour location drift as possible.

This object of the invention is solved by the features indicated in claim 1. Further embodiments of the invention are disclosed in the dependent claims.

According to the invention, a dimmable DC current source having several outputs for connecting an electrical load is suggested, wherein for each output a separate first dimming device is provided with which part of the current flowing to the particular output can be conducted to a reference potential, wherein each first dimming device has a first switch, which is controlled by a first PWM signal. Moreover, the current source according to the invention also comprises a separate second dimming device for each output, with a second switch that is controlled by a second PWM signal. A pulse-width-modulated current therefore flows through the electrical load. This current is essentially rectangular and leaps back and forth between a maximum value (high level) and a minimum value (zero). The maximum value thereby determines the colour location of the light emitted by a lamp. By suitably adjusting the duty factors of the first and second PWM signals, the maximum value of the pulse-width-modulated output current can be influenced and, in the best case, held constant. It is therefore possible to eliminate the colour location drift of the light emitted by a lamp (LED) when dimmed.

Every output of the DC current source comprises, according to the invention, a first and a second dimming device each allocated exclusively to the particular output. Both, the individual dimming devices as well as the individual outputs can be controlled or dimmed individually, i.e. independently of each other.

A switch in the sense of the invention is to be understood as any switching device that has one or several switching elements, e.g. transistors connected in series or in parallel.

Each of the second switches of the second dimming devices are preferably connected in series to the electrical load. The second dimming device with the second switch could, however, also be connected to the load in parallel.

The PWM-dimmable constant current source preferably comprises a control unit that automatically controls the switches of the first and second dimming device depending on the dimmer setting. To this end, the control unit is connected directly or indirectly to the dimming device.

According to a preferred embodiment of the invention, the control unit comprises an algorithm that sets the duty factors of the first or second PWM signal in such a way that the maximum value of current flowing through the electrical load which is connected to the output remains essentially constant during dimming. The maximum value preferably varies by less than 5%, particularly less than 1%, over the whole dimming range.

The constant current source according to the invention is preferably a regulated current source that generates a constant current at its outputs.

According to an embodiment of the invention, the dimmable constant current source according to the invention comprises a control element that can be operated by a user in order to dim either one output individually or several outputs simultaneously. Preferably, every channel is individually dimmable. For example, the control element can be embodied in hardware or software, e.g. as a scroll bar or a control dial. In principle, a user may dim an output by manipulation of either the first or the second dimming device. The DC current source according to the invention is preferably configured in such a way that the second dimming device is set by manipulation of the control element. Each dimmer setting is automatically converted into a specific duty factor, with which the switch of the manipulated dimming device of the channel concerned is controlled by the control unit. Depending on the dimmer setting made by the user, the control unit then automatically determines the appropriate duty factor for the switch of the other dimming device. At a suitable adjustment of the two duty factors, it can be achieved that the maximum value of the pulse-width-modulated current flowing through the load remains essentially constant.

The control unit can calculate the duty factor of the first or second PWM signal e.g. on the basis of the following equation:

$$(1-D_{KS}) \times I_{string} = D_{PWM} \times I_{led}$$

wherein $I_{string}$ is the maximum value of the current generated by the current source (47) on an output (CH1, CH2), $D_{KS}$ the duty factor of the first PWM signal, $D_{PWM}$ the duty factor of the second PWM signal, and $I_{led}$ the maximum value of the pulse-width-modulated current flowing through a load (10, 20).

On the basis of the equation mentioned above, however, a table ('Look-up Table') or a set of characteristic curves could also be applied, which in this case would have to only be read out by the control unit. A calculation of the duty factor would then not be required.

According to a preferred embodiment of the invention, the control unit controls the switches of the first and second dimming devices preferably at least partially out of phase, in particular in phase opposition. E.g. if the PWM signal of the first switch goes low, then at the same instant the PWM signal of the second switch goes high. In this way the voltage ripple and hence also the variation of the output current are kept small.

The multi-channel, dimmable constant current source according to the invention is preferably used for operating lamps, in particular LEDs of different colours. One or several lamps are preferably attached to each of the individual outputs. The lamps contained in a string are preferably all of the same colour.

The first dimming device is preferably connected to a node of a wire in which the current source generates a predetermined current and which leads to an output, wherein the dimming device is further switched against a reference potential. By closing the switch, the current generated by the current source is conducted to the reference potential. When the switch is open, the current flows to the particular output and drives the electrical load connected there.

According to a specific embodiment of the invention, the electrical power taken in by the current source can be adapted to the power which is actually required at the outputs. If, for example, all channels of the current source are strongly dimmed, then it is not necessary to generate the full output power. By reducing the input power of the current source (and consequently of the current generated at the outputs), the efficiency of the current source can be thereby improved. In order to adapt the output power appropriately to the need, a current regulator is preferably provided that regulates e.g. the input power or the input current of the current source (the control variable can also be a different quantity, however). Moreover, the electrical power generated on each of the individual outputs, or a equivalent quantity, e.g. a duty factor of the first PWM signal, is determined. If the required output power or the output current of any of the outputs is no greater than a predetermined threshold value, the control unit assigns e.g. a smaller current set-point to the current regulator, so that the current source generates a smaller output power. In the opposite case, if on at least one of the outputs a very high electrical power is demanded, then the output power of the current source can also be increased. The duty factor of the particular first PWM signal is a measure of the degree of the electrical power which is consumed by the allocated output, and can therefore be used for monitoring and setting the output power of the output current generated by the current source.

In order to set the power of the current source, the current regulator can be connected e.g. to a current modulator, by means of which the current which is supplied to the primary side of the current source can be set. The current modulator can be realized e.g. in LLC technology and may comprise e.g. a high-side and a low-side switch with corresponding controller.

The dimmable constant current source according to the invention preferably comprises a rectifier for every output, with which the current generated at the output is rectified. The rectifier can comprise e.g. one or several diodes, which is/are preferably provided on a branch leading to the output. The rectifier is preferably arranged on the output side of the first and on the input side of the second dimming device, i.e. between the first and second dimming devices.

The dimmable constant current source preferably also comprises a filter for filtering and smoothing the output current for every output. The filter is preferably arranged on the output side of the first dimming device and preferably downstream of the rectifier. The filter can comprise a capacitor, for example, that is arranged e.g. between a node of a wire leading to the output and a reference potential.

Both dimming devices of an output are preferably arranged on the secondary side of a transformer that generates a constant current.

The dimming devices are preferably operated purely controlled (open loop) and not regulated (closed loop).

According to a preferred embodiment of the invention, the dimmable, multi-channel current source comprises:
  a main transformer with at least two secondary coils, which
    is supplied by an alternating current having a predetermined frequency,
  at least one first branch on the secondary side, in which
    current is supplied during the positive half-wave, and a
    second branch on the secondary side, in which current is
    supplied during the negative half-wave of the supply
    current,
  wherein the first and the second branches each have a pair
    of inductors, which are wound in opposite directions and
    magnetically coupled, and
  wherein a first inductor of an inductor pair is connected to
    a first output and a second inductor of the same inductor
    pair is connected to a second output.

The inductors of the first and second inductor pairs are preferably magnetically coupled and e.g. arranged on a common magnetic core.

The coils of an inductor pair are preferably wound in opposite directions.

Each first inductor of two inductor pairs is preferably connected to a first output, and each second inductor of the inductor pairs to a second output (directly or indirectly).

Downstream of each of the individual inductors of an inductor pair there can be one or several further inductor pairs.

BRIEF DESCRIPTION OF THE DRAWINGS

The invention will be exemplarily described in more detail below with reference to the attached drawings. They show:

FIG. 1b—an enlarged portion of the CIE colour table of FIG. 1a;

DETAILED DESCRIPTION

Figure 1A:
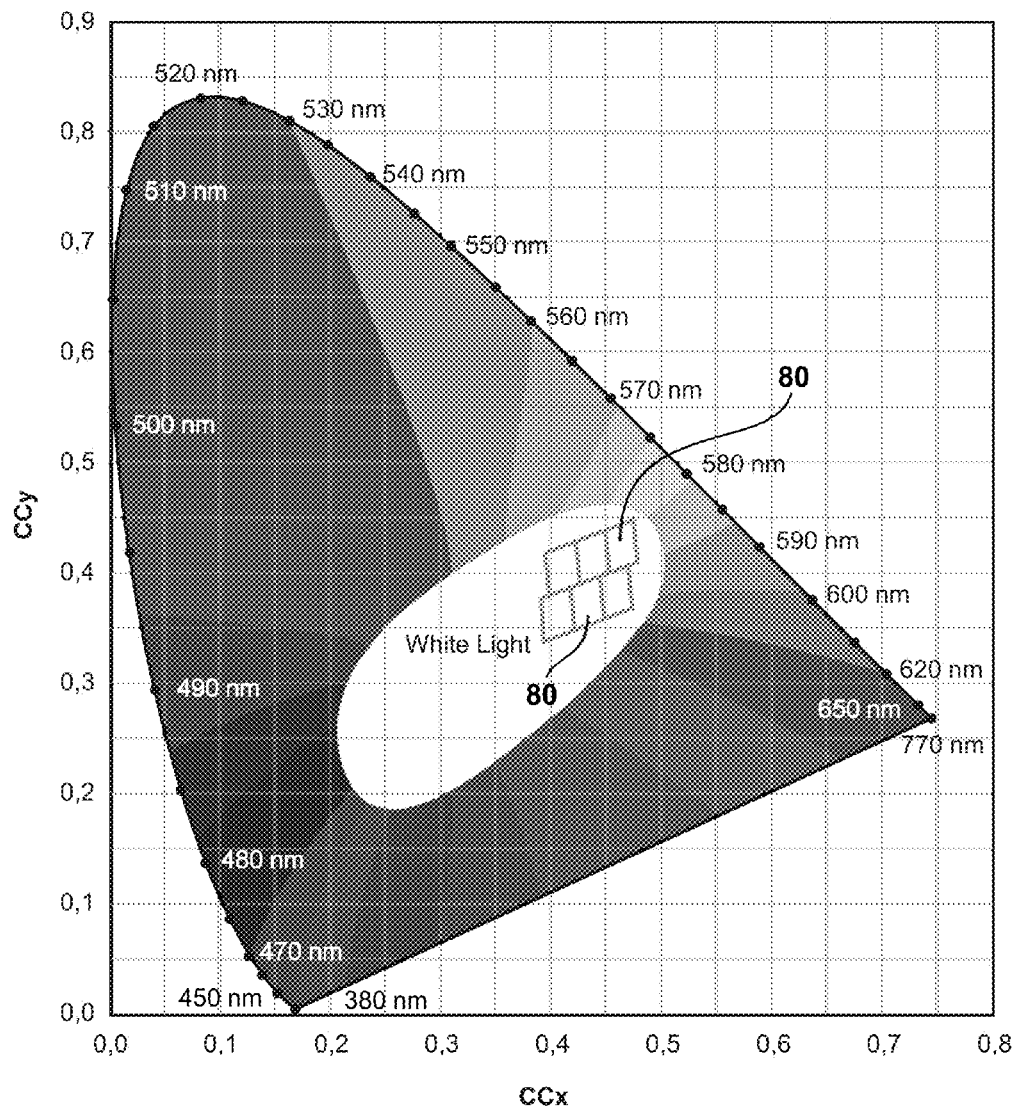
FIG. 1a—a CIE colour table for representing the perceptible spectrum.
Figure 1B:
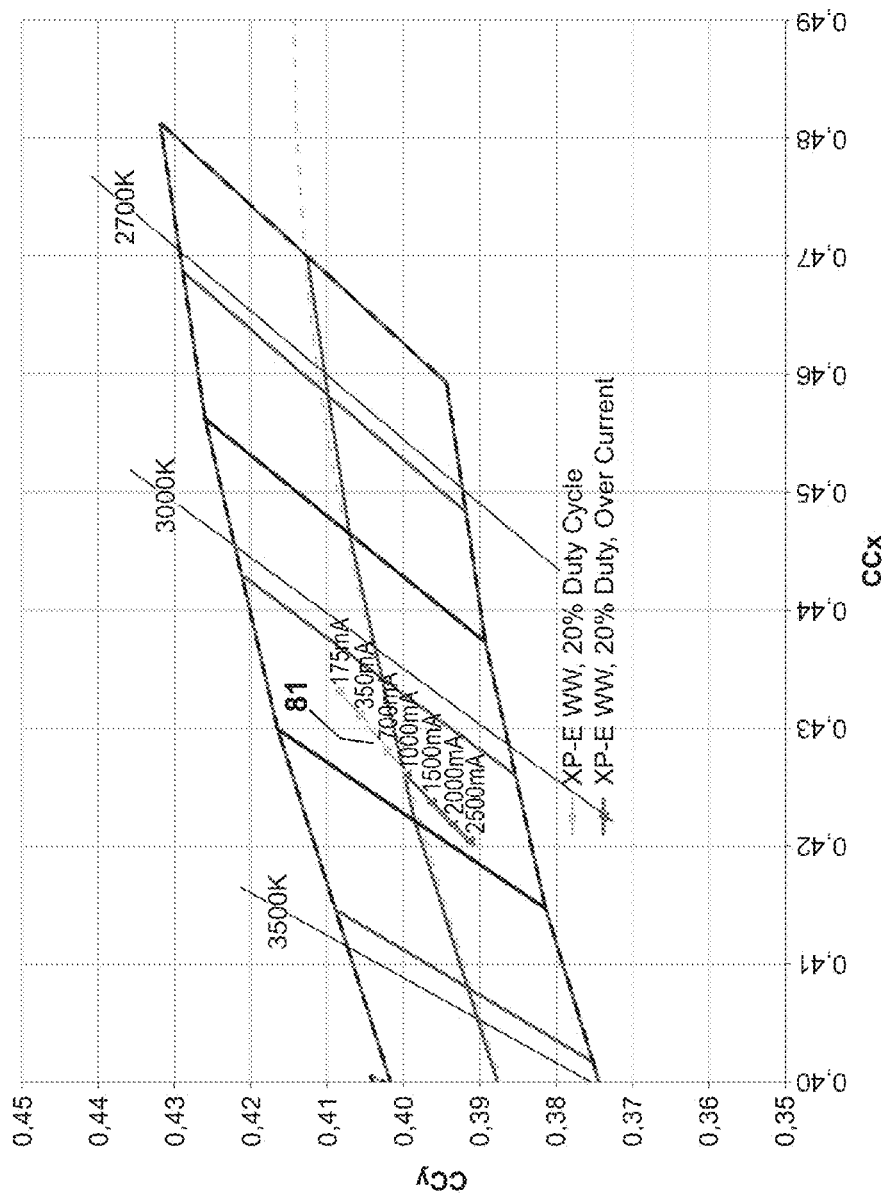

Concerning the description of FIGS. 1a and 1b, reference is made to the introductory part to the description.

Figure 2:
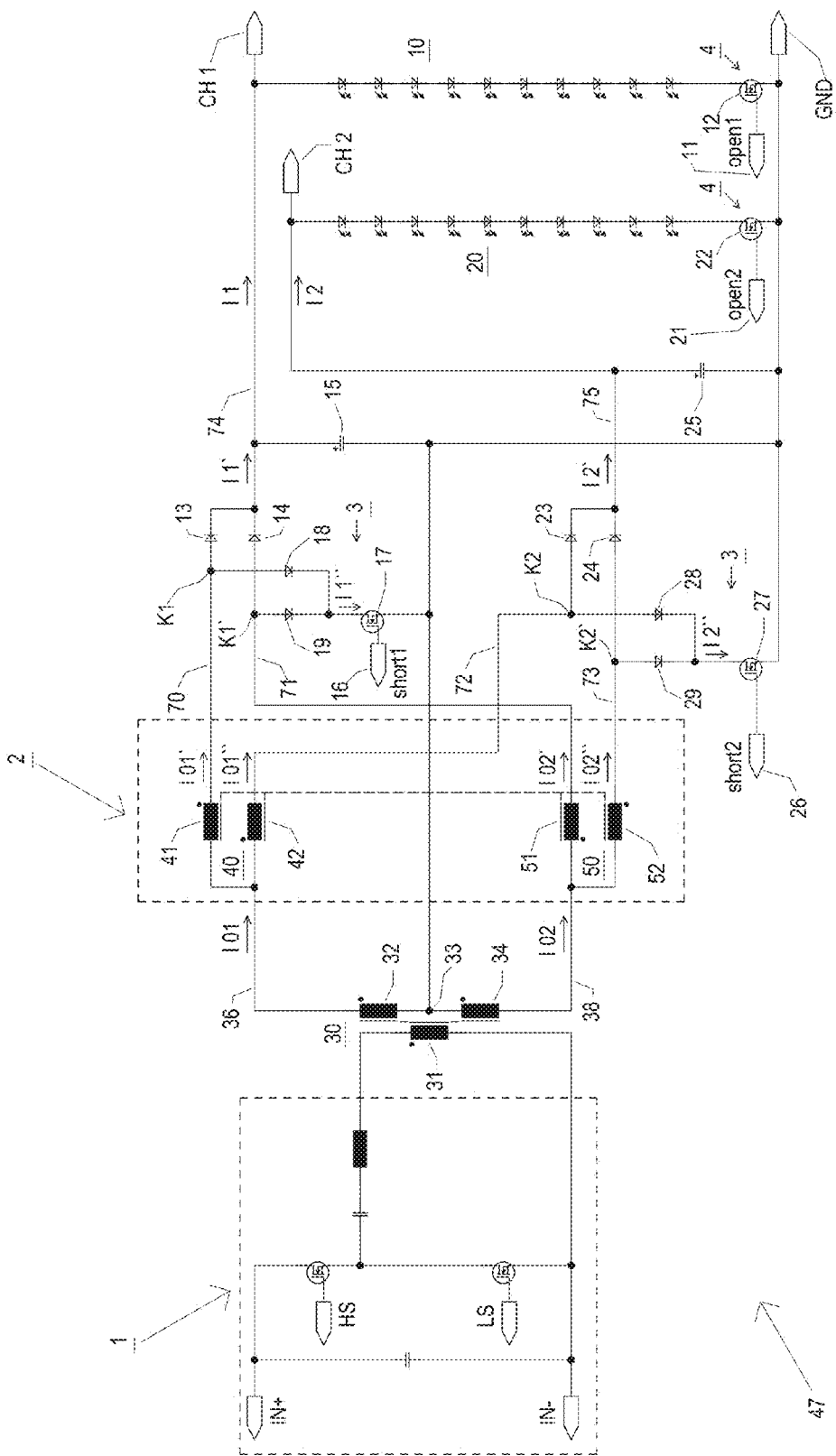
FIG. 2—an exemplary embodiment of a multi-channel dimmable DC current source, in which two dimming devices are provided for every channel.

FIG. 2 shows a schematic circuit diagram of a multi-channel, dimmable current source 47 with a total of two outputs CH1, CH2. The current source 47 delivers a regulated current that is independent of the output load to each of the outputs CH1, CH2. Each of the outputs CH1, CH2 is individually dimmable via a dedicated first dimming device 3 and a dedicated second dimming device 4.

Basically any electrical load can be connected to the individual outputs CH1, CH2. The multi-channel current source according to the invention is, however, preferably used for operating LEDs of various colours.

In the embodiment shown in FIG. 2, an LED string 10 or 20 respectively is connected to each of the outputs CH1, CH2. Every LED string thereby comprises several—here ten—LEDs connected in series. The individual LEDs of an LED string 10, 20 are preferably of the same colour and can be e.g. red, green or blue. By mixture of colours, a colour that is perceived by an observer is finally generated by the light emitted by the LEDs.

Figure 6:
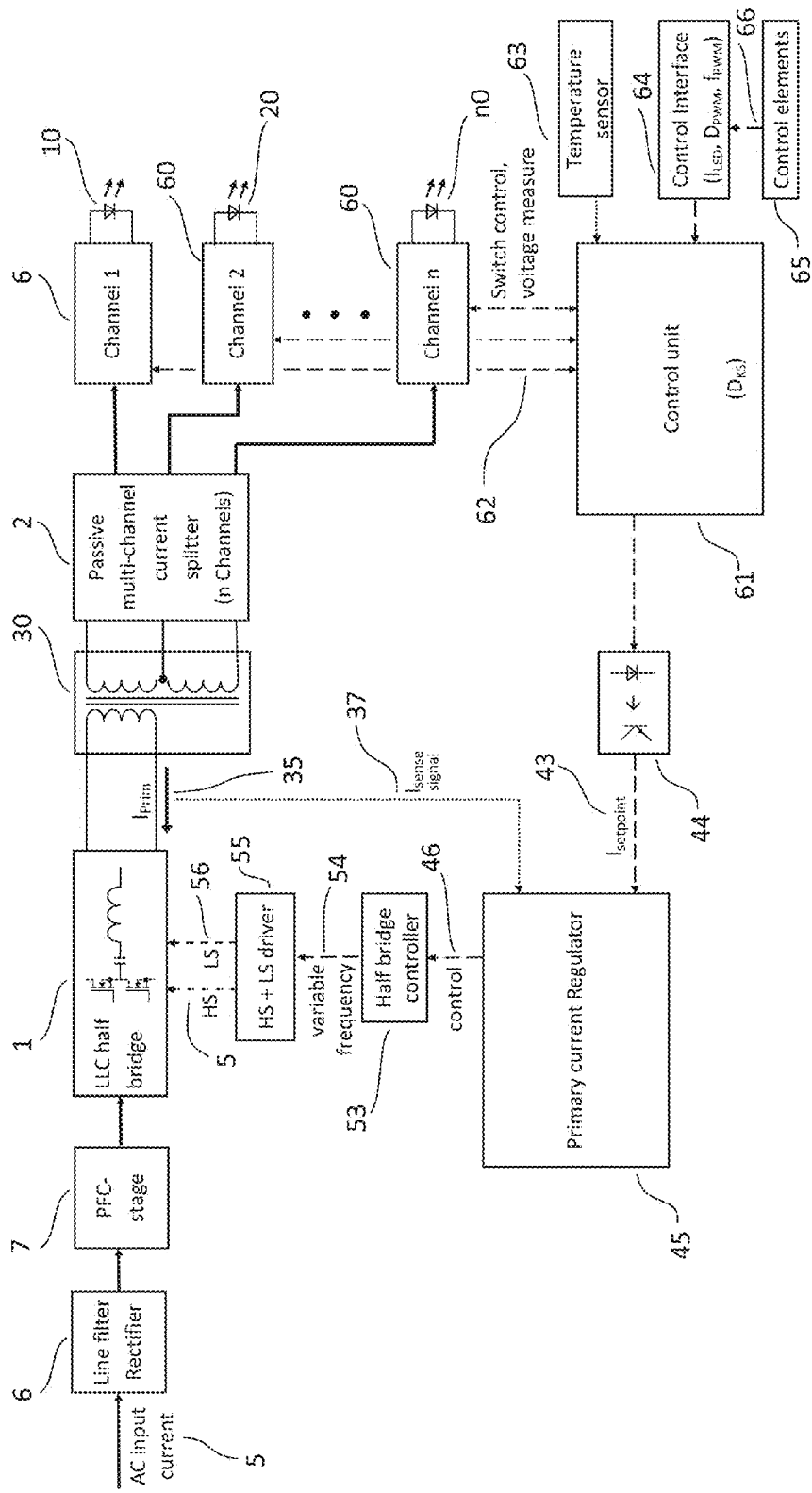
FIG. 6—a general view of a dimmable, multi-channel current source according to the invention, according to a specific embodiment of the invention.

The dimmable constant current source shown in FIG. 2 furthermore comprises a main transformer 30 that is supplied by a primary circuit part 1 (not described in more detail here) with an alternating current having a regulated current portion. The primary circuit part can be manufactured e.g. in LLC technology, such as is known e.g. from US 2010/016,440 A1 (FIG. 6). The main transformer 30 moreover has two secondary coils 32, 34, which are connected via a centre tap 33 in series. The centre tap 33 is thereby connected to a reference potential—here ground. In the circuit branches 36, 38 supplied by the secondary coils 32, 34, a fixed, predetermined, known current I01 or I02 therefore flows. One of the circuit branches on the secondary side (e.g. branch 36) thereby carries the current I01 generated during the positive half-wave, and the other circuit branch (e.g. branch 38) the current I02 generated during the negative half-wave. The currents I01 and I02 are then split up between the individual outputs CH1 and CH2 by means of a current divider.

For each of the circuit branches on the secondary side 36 and 38, the current divider 2 comprises an inductor pair 40, 50, each of which having two inductors 41, 42 or 51, 52 respectively that are poled in opposite directions to each other. The two inductor pairs 40, 50 are thereby likewise magnetically coupled to each other and can be located e.g. on a common core.

In each case, one of the inductors—here 41 or 51—is thereby connected to the first output CH1 and the other inductor in each case—here 42 and 52—is connected to the other output CH2. The number of windings of the individual inductors 41, 42, 51, 52 is preferably identical. In this case, the current I01 and I02 is divided equally between the two outputs CH1 and CH2. If the current I01 or I02 comes to e.g. 2 A, then the output current on the outputs CH1 and CH2 respectively is 1 A.

For further details of a multi-channel current source, reference is made to WO 2011/047817 A9 of the applicant, the corresponding passages of which are included in the description by reference.

The current source according to the invention moreover comprises for every output CH1, CH2 a separate first dimming device 3 that is here attached in each case to a node of a wire 70-73 leading to an output CH1 or CH2, on the output side of the inductors 41, 42, 51, 52. To each of the wires 70-73 leading from the inductors 41, 42, 51, 52 to the output, a rectifier is furthermore connected, in the present case a diode 13, 14, 23, 24. Moreover, the dimmable, multi-channel current source 47 also comprises, for every output CH1, CH2, a filter for filtering and smoothing the output current I1, I2, wherein in this case the filter comprises a capacitor 15, 25 that is arranged between the particular output wire 74, 75 and a reference potential GND.

Every first dimming device 3 comprises a switch 17, 27 that is controlled at its particular input 16 or 26 by means of a first PWM signal short1, short2. The PWM signals short1, short2 can be different. Depending on the duty factor $D_{KS}$ of the PWM signals short1, short2, a greater or smaller part of the current supplied by the current source 47 on the secondary side flows to the reference potential (ground). This proportion is equivalent to a power reduction of the current source 47. Depending on the duty factor $D_{KS}$ of the PWM signal 16, 26, a desired current value is set for the output CH1 or CH2. The output current I1' ($I_x$) of the output CH1 is given depending on the maximum current $I_{string}$ and the duty factor $D_{KS}$ ($0<D_{KS}<1$) according to:

$$I1'=(1-D_{KS})\times I_{string}$$

Thereby, $D_{KS}=0$ if the short-circuiting switch 17, 27 is always open, and $D_{KS}=1$ if the short-circuiting switch 17, 27 is always closed. The frequency of the PWM signal short1, short2 can range between e.g. 40 Hz and 10 kHz, but it can also be higher or lower.

For every output CH1, CH2, a dimming device 4 is furthermore provided that in each case comprises a second switch 12, 22 that is controlled by means of a PWM signal open1, open2. Therein the switch 12, 22 is connected in series to the electrical load 10, 20. By variation of the duty factor $D_{PWM}$ of the PWM signal, with which the second switch 12, 22 is controlled, the particular output CH1, CH2 can also be individually dimmed. The switches 12, 22 can be transistors, for example, like e.g. MOS transistors.

When using the dimmable, multi-channel current source 47 for operating a light system with multi-coloured LEDs 10, 20, a shifting of the colour location of the light emitted by the LEDs 10, 20 can arise, as mentioned in the introductory part. As has been shown, the maximum value of the pulse-width-modulated output current I1, I2 decisively determines the location of the colour location of the light emitted by a lamp. When the duty factors of the first and second PWM signals are suitably set, the maximum value of the pulse-width-modulated output current can be influenced and, in the best case, held constant.

Figure 3:
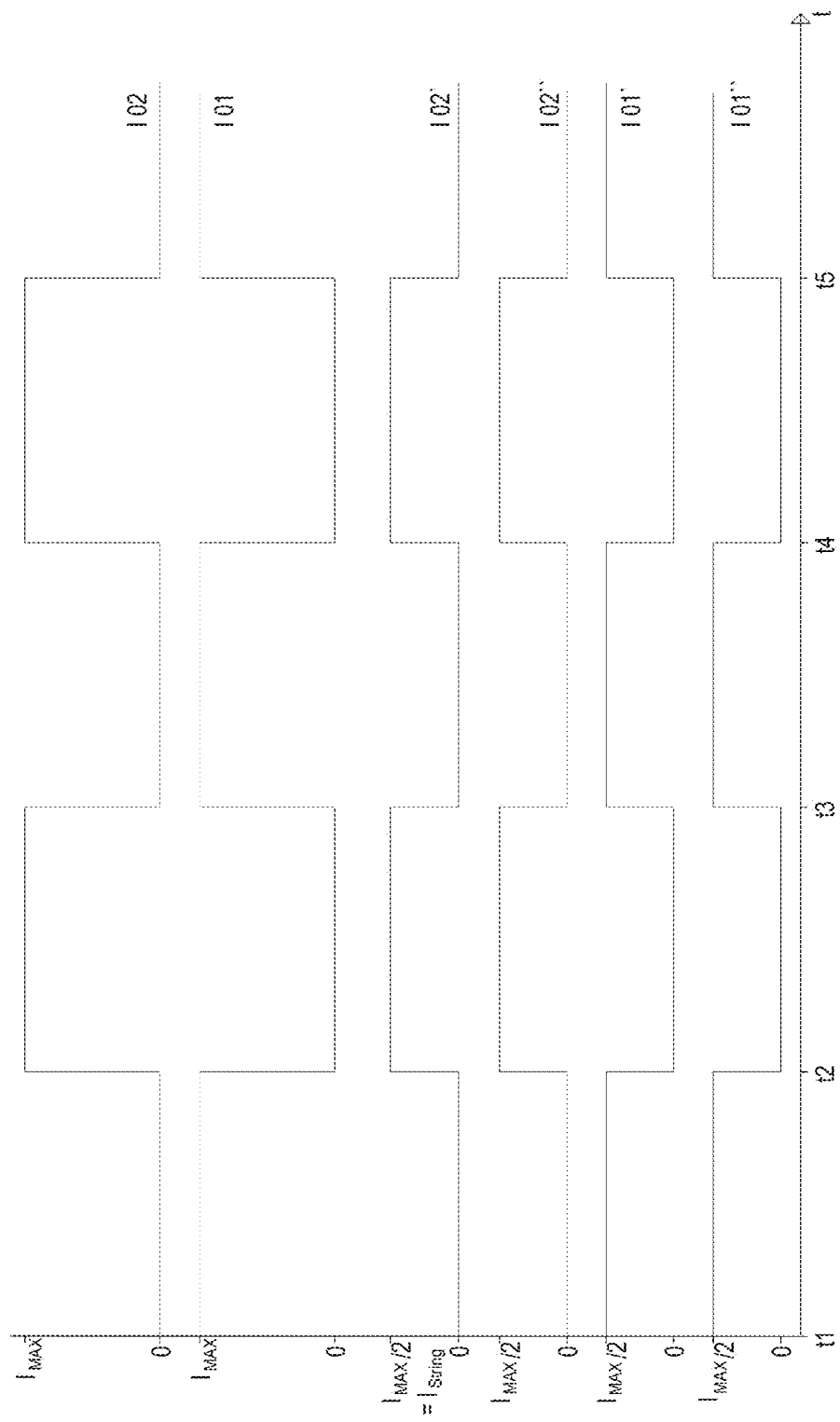
FIG. 3—the time variation of various current signals in the circuit of FIG. 2.

FIG. 3 shows the time variation of various currents in the current source of FIG. 2. Through the series connection of the secondary coils 32, 34, the currents I01 and I02 are in exact phase opposition, but their amplitudes are the same ($I_{Max}$). Due to the polarity of the output rectifiers 13, 14, 23, 24, only positive current flows. As the current I01 or I02 respectively in each case is divided up equally by an inductor pair 40 or 50 respectively with the same winding ratio of 1:1, in each of the coils 41, 42 or 51, 52 respectively the same current I01', I01" or I02', I02" respectively flows. It can be clearly seen in FIG. 3 that the currents I01' and I02' as well as I01" and I02" are just as out of phase with each other as the currents I01 and I02 supplied by the secondary coils, but have exactly half the amplitude $I_{Max}/2$ of them. The output current I1' of the first output CH1 results from the out-of-phase currents I01' and I02' after the rectifiers 13, 14. The output current I2' of the second output CH2 is composed of the partial currents I01" and I02". The currents I1' and I2' are then each filtered by a filter—here a capacitor 15 or 25 respectively—and averaged and supplied to the connected LED load 10 or 20 respectively as I1 or I2 respectively.

Figure 4:
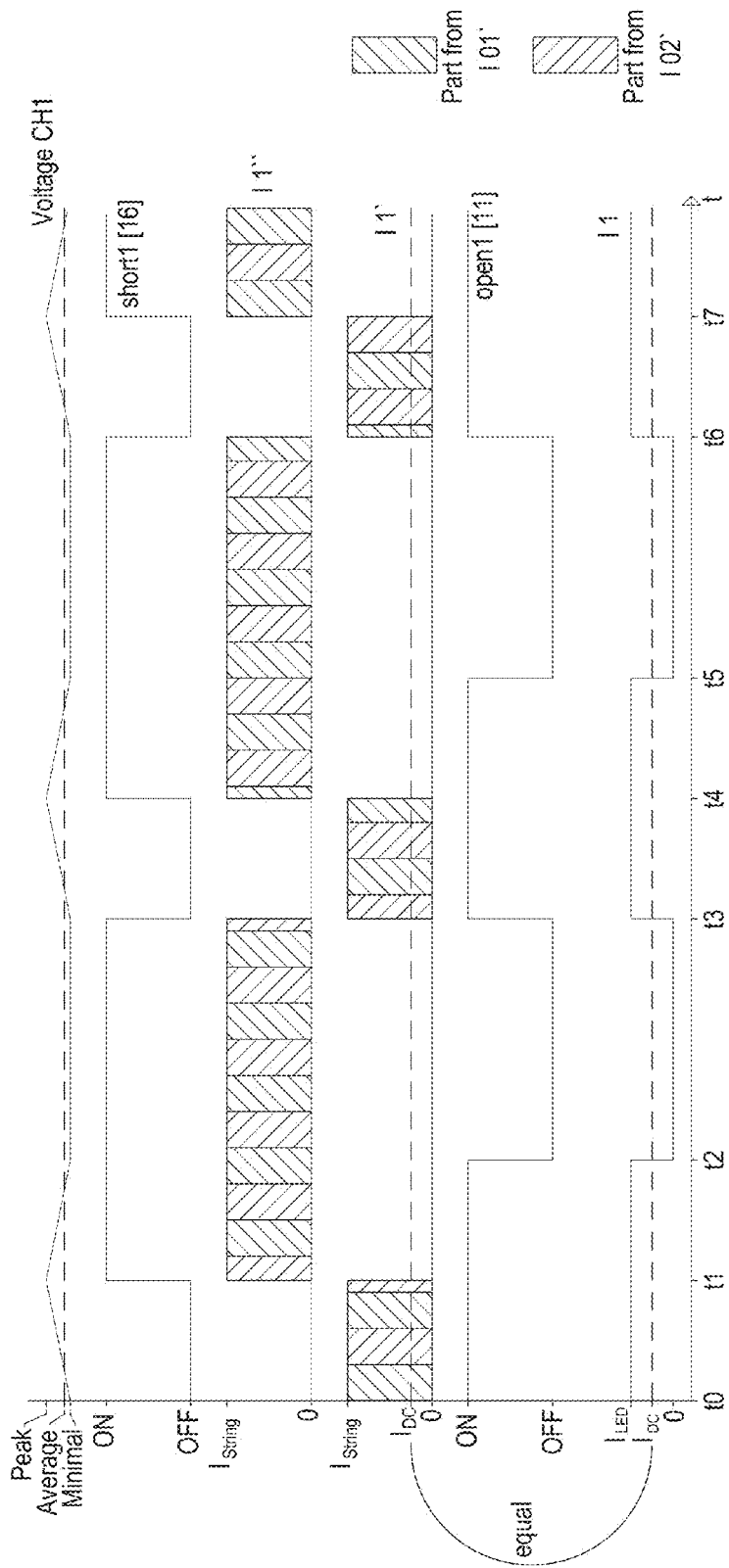
FIG. 4—the time variation of various PWM signals, with which the switches of the first and second dimming device are controlled, as well as the time variation of the pulse-width-modulated current in case of an out-of-phase control of the switches.

FIG. 4 shows the time variation of various PWM signals short1, short2, open1, open2, with which the switches 17, 27, 12, 22 of the first and second dimming devices 3, 4 are controlled, as well as the time variation of the pulse-width-modulated current in an out-of-phase control of the switches. A high-level (5V-15V) of the PWM control signal short1 of the first switch 17 turns the switch 17 on. Through this, the partial currents I01' and I02' are conducted via rectifier 18, 19 as a current I1" through the switch 17 to the reference potential GND. While the switch 17 is active, there flows no current I1' to the output. A low level (0V) at the control input 16 of the switch 17 turns the switch 17 off. The partial currents I01' and I02' then flow again via the rectifier 13, 14 as a current I1' to the output CH1. The current I1' thereby fluctuates between a maximum value Istring and a minimum value zero.

From the duty factor $D_{KS}$ of the PWM signal short1 and the maximum value $I_{string}$ of the current I1' there results a mean current $I_{DC}$ flowing to the output CH1 (averaged current I1'):

$$I_{DC}=(1-D_{KS})\times I_{string} \quad (1)$$

The mean current $I_{DC}$ is thereby shown in FIG. 4 as a dashed line. Furthermore differently-shaded areas show how the currents I1' and I1" are composed from the phase-shifted partial currents I01' and I02".

The switch 12 of the second dimming device 4 is controlled by means of a PWM signal open1. A high-level turns the switch 12 on again, and a low-level turns it off, as a result of which the current I1 flowing through the LEDs 10 becomes zero. A pulse-width-modulated current I1 therefore flows through the LEDs 10.

The mean current $I_{DC}$ flowing through the LEDs results from the duty factor $D_{PWM}$ of the PWM signal open 1 and the maximum value $I_{led}$ of the current I1 flowing through the LEDs 10 as:

$$I_{DC}=D_{PWM}\times I_{led} \quad (2)$$

The current $I_{DC}$ is likewise shown as a dashed line in FIG. 4. The maximum value Iled thereby determines the colour location, while the brightness is set with $D_{PWM}$.

In a stable condition, the average charging current in the capacitor 15 must be equal to the average discharging current. Both average values $I_{DC}$ of the currents I1 and I1' are the same in this case, and it comes to:

$$(1-D_{KS})\times I_{string}=D_{PWM}\times I_{led} \quad (3)$$

If this balance is not present, then the capacitor continues to charge or will finally completely discharge. When the parameters $D_{KS}$, $D_{PWM}$ and $I_{string}$ are constant, the correct voltage is always obtained automatically at the capacitor 15, in order to supply $I_{led}$. If e.g. the capacitor voltage is too small to supply the predetermined $I_{led}$, then the charge proportion of equation (1) is larger and thereby raises the capacitor voltage for as long as it takes until the equilibrium of equation (3) is achieved. If, on the other hand, the capacitor voltage is too large, then the discharge portion of equation (2) is larger, and the voltage—and with it also the LED current—fall for as long as it takes until equilibrium is restored. This is possible, since $I_{string}$ is a regulated constant current.

As $I_{string}$ is predetermined by the primary circuit part 1, the required $D_{KS}$ can be calculated from equation (3) for every desired $I_{led}$ and $D_{PWM}$ (and conversely):

$$D_{KS}=1-\frac{D_{PWM}\times I_{led}}{I_{string}} \quad (4)$$

A duty factor $D_{KS}$ of 1 means that the corresponding channel CH1 or CH2 respectively is turned off, with $0 \leq D_{KS} \leq 1$.

From equation (3), the current $I_{string}$ can also be calculated for a predetermined $D_{KS}$.

$$I_{string}=\frac{D_{PWM}}{(1-D_{KS})}\times I_{led} \quad (5)$$

If the switch 17 is not turned on, i.e. $D_{KS}=0$, and the switch 12 of the dimming device is always on, so $D_{PWM}=1$, then the LED current I1 is equal to the current I1' supplied by the divider stage 2, so it comes to $I_{led}=I_{string}$. In general, this always applies, if the equation (6) is fulfilled:

$$D_{PWM}=1-D_{KS} \quad (6)$$

The duty factor $D_{KS}$ should preferably be smaller than 1, better still smaller than 0.9, in order not to exceed the technical limits of the whole ballast when there are relatively large currents $I_{string}$.

The capacitor 15 is preferably dimensioned in such a way that the voltage ripple at the output CH1 (shown right at the top in FIG. 4), caused by the control of the switch 17, 12, is as small as possible, and in particular lies below a predetermined threshold. The smallest ripple emerges if equation (6) is fulfilled and both switches 17, 12 are working in phase opposition. There is a maximum value of the voltage ripple exactly where they are controlled in phase. As equation (6) regularly is not fulfilled, it is also sufficient for the PWM signals short1 and open1 to be in phase opposition for as long as possible. The PWM signal short1 can be switched off e.g. if the signal open1 goes on, or conversely.

The PWM signals short1 or open1 respectively of the switches 17 or 12 respectively preferably have the same frequency, but do not necessarily have to. (e.g. the frequency of the first dimming device can be 10 khz and that of the second 50 kHz). In this case, operating the switches in phase opposition would be relatively easy to accomplish.

Figure 5:
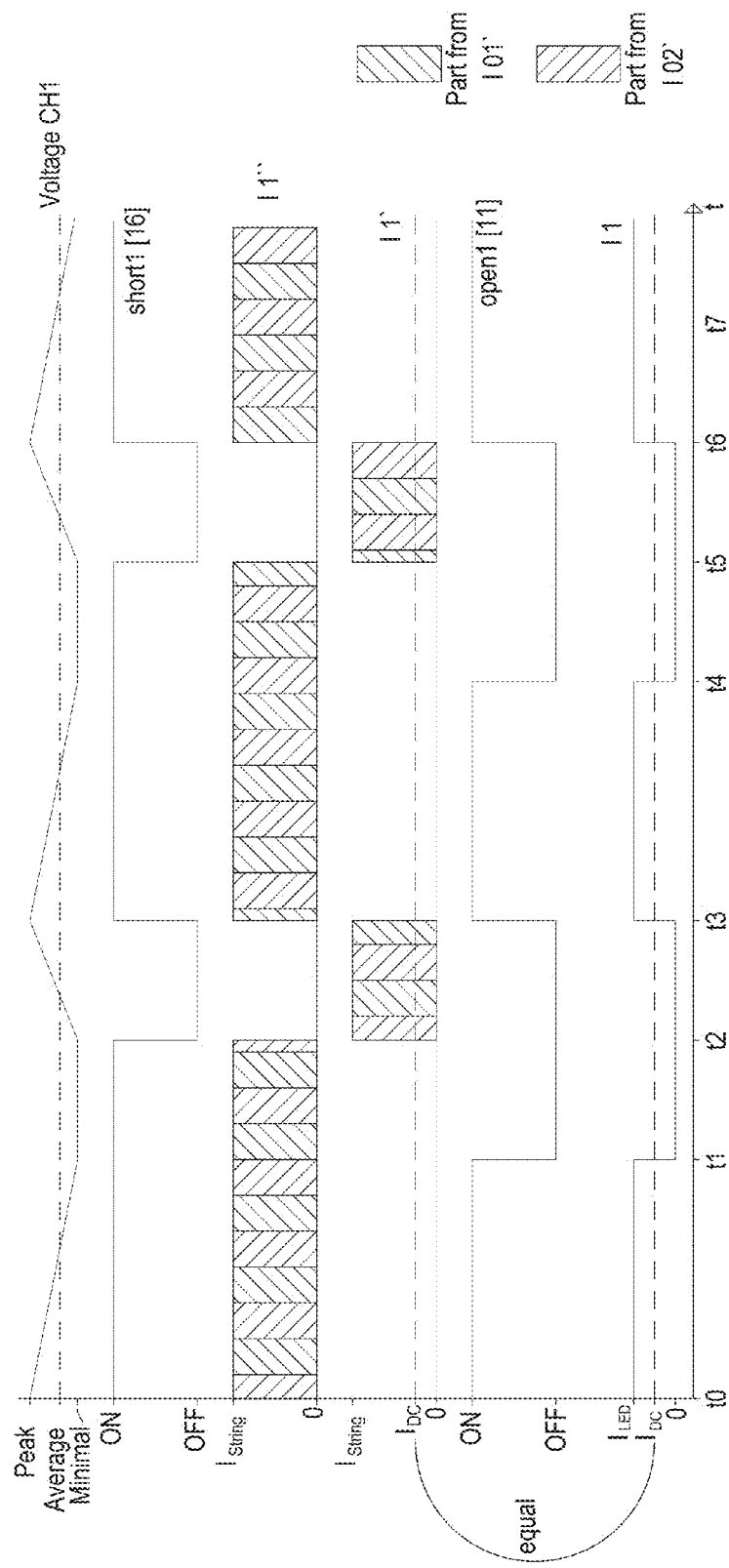
FIG. 5—the time variation of various PWM signals, with which the switches of the first and second dimming device are controlled, as well as the time variation of the pulse-width-modulated current in case of an in-phase control of the switches.

FIG. 5 shows the same signals as FIG. 4, wherein the two switches 17 and 12 are controlled in-phase, however. As can be seen in the voltage diagram (right at the top), the ripple of the voltage on the output CH1 is exactly double that in FIG. 4.

The same equations and relationships can be used for the second output CH2 and any further outputs.

FIG. 6 shows a block diagram of a multi-channel, dimmable current source 47 having a control unit 61 for controlling the switches of the first and second dimming devices 3 and 4 respectively. In order to dim the individual outputs or channels 60 respectively, in each case there is provided a control element 65, like e.g. a slide control, which can be implemented in hardware or software. The output signals of the operating elements 65 are transmitted via an interface 64 (e.g. DALI, DMX or similar) to the control unit 61. The dimmer setting of the individual operating elements 65 is thereby converted to a duty factor $D_{PWM}$ for the switches of the second dimming device 4. Moreover, the control unit 61 receives the maximum value $I_{led}$ of the current Ix in the individual channels 60, wherein x=1 . . . n, corresponding to the number n of channels.

Moreover, the dimming frequency $f_{PWM}$ is also transmitted to the control unit 61 via the interface 64. The control unit 61 then determines, on the basis of these parameters, a duty factor $D_{KS}$ of the particular first dimming device 3 for every output 60. The individual duty factors $D_{KS}$ can be calculated for example according to the equation (4), or retrieved from a table or from a set of characteristic curves.

FIG. 6 furthermore shows an alternating current grid 5, which can supply the whole system. After filtering and rectifying in block 6, there follows a PFC level 7, in order to avoid an output ripple with the doubled power frequency. An LLC power stage 1 then operates the transformer 30 already described.

The current 35 flowing in the primary coil is transformed e.g. by means of a current transformer into a voltage 37, which represents the actual value of a primary current regulator 45. By means of a signal 46, the current regulator 45 controls a half-bridge controller 53 that in turn generates a signal 54 with variable frequency which is output to a half-bridge driver 55, which alternately controls the high-side transistor 57 and the low-side transistor 56 of the LLC half-bridge 1. The secondary side of the transformer 30 then supplies a multi-channel passive divider stage 2, as is exemplarily shown in FIG. 2 and furthermore is described in more detail in WO 2011/047817 A9.

The current device temperature of the control unit 61 can optionally be determined by means of a temperature sensor 63. When an upper temperature limit is exceeded, the current source can e.g. be automatically turned off or/and dimmed down.

In order to adapt the electrical power provided by the current source at its output to the actual requirement, a current regulation can be carried out, for example. If the electrical power which is requested at an output CH1 to CHn is, for none of the outputs, greater than a predetermined value, e.g. 80% of the power supplied to the particular channel, then the current 35 flowing in the primary coil is preferably reduced. In order to monitor the power requirement of the individual outputs CH1 to CHn, the duty factor $D_{KS}$ of the individual channels can be monitored, as is explained in the following with reference to FIG. 8. In order to carry out the current regulation, the control unit 61 is connected via an interface 44, like e.g. an optocoupler, with the voltage regulator 45, and provides it with a new current set-point 43. The latter is then set via the previously named units 53, 55, 1.

Figure 7:
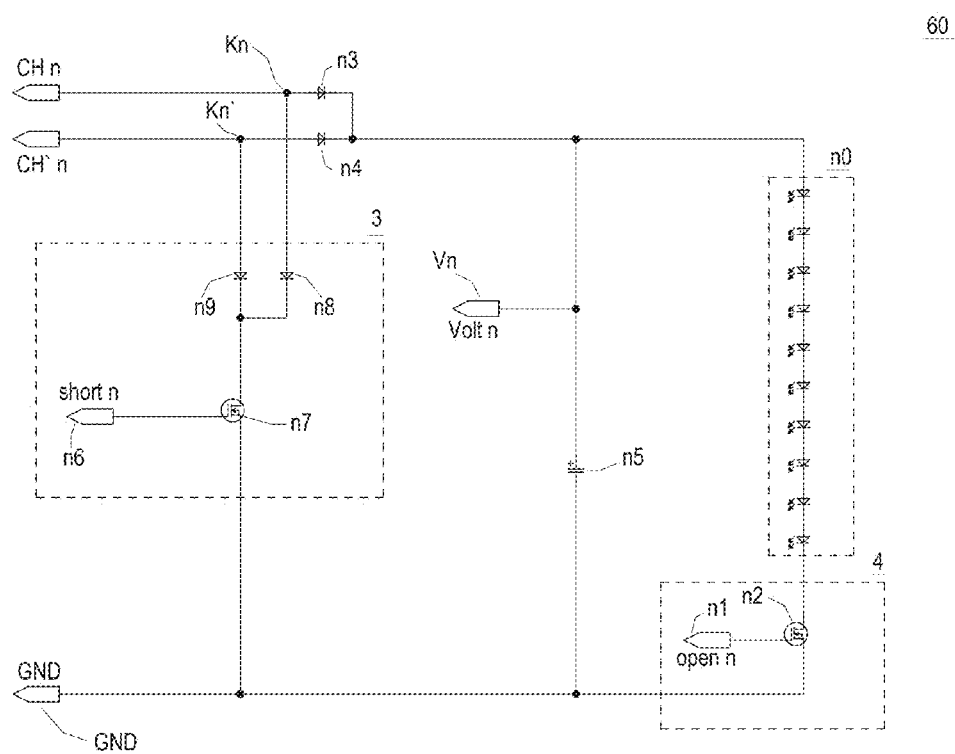
FIG. 7—an enlarged view of an output of the current source according to FIG. 2.

FIG. 7 shows one of the outputs CH1-CHn in enlarged form. A first dimming device 3 comprises in each case decoupling diodes n8 and n9, which are connected to the nodes Kn and Kn' and both of which are connected to a power terminal (drain) of the switch n7 (n thereby stands for the channel number). The output voltage Vn for the control unit 61 is tapped directly at the output CHn. The switch n2 is connected directly in series with the minus pole of the LED load n0 and the reference point GND. The switch n2 is controlled by means of a control signal open n by the control unit 61. This output circuit 60 is provided once for every channel CH1 to CHn.

Figure 8:
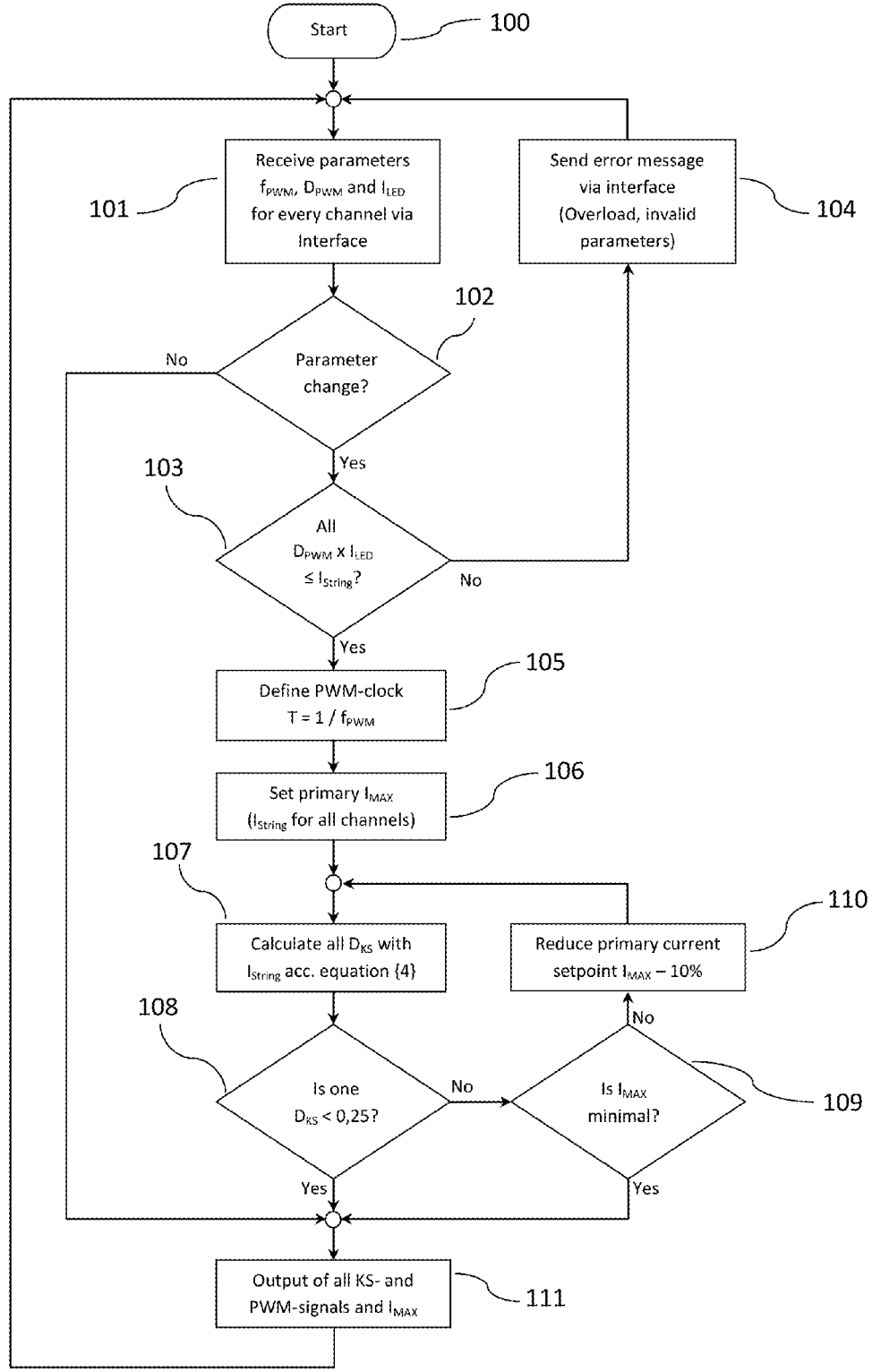
FIG. 8—a method for operating the current source of FIG. 6 according to an embodiment of the invention.

An example of a software routine, which may run e.g. on a microcontroller 61, is shown in FIG. 8. In order to make the diagram not too complex, the aforementioned control for the two switches n2, n7 was omitted.

After the start (box 100) of the multi-channel current source 47, the required parameters, i.e. the dimming frequency $f_{PWM}$, the maximum value $I_{led}$ of the output current and the duty factor $D_{PWM}$ of the second dimming device, are read. If no parameters have changed compared to the last data transfer, then everything can be kept unchanged and the process can skip to the last step 111. However, if the query 102 results in a parameter change, then in the next step 103, it is examined if all parameters are within the valid range. Concretely, here it is queried whether in any channel a maximum current value has been exceeded. If this is indeed the case, then in step 104 an error report is sent via the interface 64 to the superordinate system. Then the method returns to the reading step 101. If, however, all parameters are valid, then the frequency information $f_{PWM}$ is processed (step 105). Thereby, the reciprocal value of the frequency $f_{PWM}$ is the time base for outputting the control signals short n for the switches of the first dimming device 3 and the control signals open n for the switches of the second dimming device 4. Next, the device-internal parameter $I_{Max}$ for the primary total current set-point, and with it also $I_{string}$ for every channel CH1 to CHn, is set to the maximum possible value (step 106). These values are predetermined by the dimensioning of the primary part 1, the transformation ratio of the transformer 30 and the layout of the divider stage 2. Then, from the parameters $I_{led}$, $D_{PWM}$ and $I_{string}$ of each channel CH1 to CHn, the necessary duty factors $D_{KS}$ of the short-circuiting switch n7 are determined in step 107 according to equation (4). The subsequent query 108 establishes whether a channel is already being operated in an upper range, e.g. above 75% of the maximum output current. This boundary value can, of course, also be larger or smaller, depending on which dynamic requirements are imposed on the whole system. If the predetermined threshold value is not exceeded by any channel, i.e. none of the channels are operating at close to their power limit, then the current set-point is reduced. In this, firstly, in step 109 an evaluation is made as to whether the primary current 35 is not already at the predetermined minimum required by the system. This can be e.g. 5% or 10% of the maximum value, and also depends on the dimensioning of the primary stage 1. If this is the case, then the method skips to step 111, as the primary current 35 cannot be further reduced.

If, on the other hand, the query of step 109 is negative, then the primary current 35 is preferably reduced to a predetermined value, e.g. 10%. The new current $I_{Max}$ thereby also forms the reference for the new maximum possible current $I_{string}$ for every channel CHn. With the adapted current values $I_{string}$ for every channel CH1 to CHn, new duty factors $D_{KS}$ for every channel are then again determined in step 108. After several repetitions of the loop, the primary current cannot be further reduced, or a channel is now close to the power limit, and the method moves on to step 111. In this step, all switches of the first and second dimming device 3, 4 are controlled with the previously-determined signals. After that, the method returns to the reading of the parameters in step 101.

The current source 47 could also be optionally equipped with a colour sensor. If there is a deviation of a colour shown from a predetermined set-point, the switches of the individual dimming device could then be automatically controlled correspondingly in order to regulate a colour deviation. In this, a suitable regulator should also be provided.

The invention claimed is:

1. A current source (47) comprising:
    several outputs (CH1, CH2), which provides a constant current (I1, I2) for operating an electrical load (10, 20) at each output (CH1, CH2),
    wherein for each output (CH1, CH2) a first dimming device (3) is provided, with which part of the current (I1', I2') flowing to the output is conducted to a reference potential (GND) and which always comprises a first switch (17, 27) that is controlled by a first PWM signal (short1, short2), and
    wherein for each output a separate second dimming device (4) is provided that has a second switch (12, 22), which is controlled by a second PWM signal (open1, open2), so that each output (CH1, CH2) is individually dimmed with the help of its associated first and second dimming device (3, 4).

2. The current source (47) according to claim 1, wherein the second switch (12, 22) is connected in series to the electrical load (10,20).

3. The current source (47) according to claim 1, wherein it has a control unit (61) that controls the switches (17, 27, 12, 22) depending on a dimmer setting.

4. The current source (47) according to claim 3, wherein the control unit (61) controls the switches (17, 27, 12, 22) in such a way that the predetermined maximum value (ILED) of the pulse-width-modulated current (I1, I2) flowing through the load (10, 20) remains essentially constant, if the dedicated output (CH1, CH2) is dimmed.

5. The current source (47) according to claim 3, wherein the control unit (61) determines a duty factor (DPWM, DKS) of the first and/or second PWM-signal (short1, short2, open1, open2) depending on the dimmer setting (66).

6. The current source (47) according to claim 5, wherein the control unit (61) determines the duty factor (DPWM, DKS) of the first and/or second PWM-signal based on the following equation:

$$(1-DKS) \times I\text{string} = DPWM \times I\text{LED}$$

wherein Istring is the maximum value of the current generated by the current source (47) at an output (CH1, CH2),
DKS the duty factor of the first PWM signal,
DPWM the duty factor of the second PWM signal, and
ILED the maximum value of the pulse-width-modulated current flowing through a load (10, 20) connected to an output (CH1, CH2).

7. The current source (47) according to claim 3, wherein the control unit (61) controls the switches (17, 27, 12, 22) at least partially in phase opposition.

8. The current source (47) according to claim 1, wherein there are lamps (10, 20) connected to the outputs (CH1, CH2), and in particular LEDs of various colours and/or white LEDs of various colour temperatures.

9. The current source (47) according to claim 1, wherein in a wire (70-73) leading to an output (CH1, CH2), in which the current source provides a predetermined current (I01', I01", I02', I02"), a node (K1, K1', K2, K2') is provided, to which the first dimming device (3) is connected against a reference potential.

10. The current source (47) according to claim 3, wherein the control unit (61) is connected to a regulator (45) that regulates a current which is drawn at the primary side of the current source (47) or a quantity depending thereof, wherein the electrical power provided at the individual outputs (CH1, CH2), or a quantity equivalent of a duty factor (DKS) of the first PWM signals (short1, short2), is determined, and wherein the control unit (61) assigns a set-point (ISetpoint) to the regulator (45) depending on the determined quantities.

11. The current source (47) according to claim 10, wherein the current regulator (45) is connected to only one current modulator (1), by means of which a current supplied to the primary side of the current source (47) is set.

12. The current source (47) according to claim 1, wherein for every output a full-wave rectifier (13, 14, or 23, 24 respectively) is provided.

13. The current source (47) according to claim 1, wherein for every output (CH1, CH2) a filter (15, 25) is provided for filtering and smoothing the output current (I1, I2).

14. The current source (47) according to claim 13, wherein the filter comprises a capacitor (15, 25).

15. The current source (47) according to claim 1, further comprising:
    a main transformer (30) with at least two secondary coils (32, 34), which is supplied by an alternating current having a predetermined frequency,
    at least one first branch (36) on the secondary side, in which current is supplied during the positive half-wave, and a second branch (38) on the secondary side, in which current is supplied during the negative half-wave of the supply current, wherein
    the first and the second branch (36, 38) each have a pair of inductors (40, 50) which are wound in opposite directions to each other and are magnetically coupled; and
    wherein a first inductor of an inductor pair (40, 50) is connected to a first output (CH1) and a second inductor (42) of the same inductor pair (40) is connected to a second output (CH2).

16. The current source (47) according to claim 15, wherein the inductors (41, 42, 51, 52) of the first and second inductor pair (40, 50) are magnetically coupled.

17. The current source (47) according to claim 15, wherein the inductors (41, 42, 51, 52) of an inductor pair (40, 50) are wound in opposite directions to each other.

18. The current source (47) according to claim 14, wherein a first inductor (41, 51) of two inductor pairs (40, 50) in each case is connected to a first output (CH1), and a second inductor (42, 52) of the inductor pairs (40, 50) in each case is connected to a second output (CH2).

19. The current source (47) according to claim 14, wherein downstream to the inductors (41, 42, 51, 52) of an inductor pair (40, 50), there are provided one or several further inductor pairs, so that the current flowing through the first inductors (41, 42, 51, 52) divides up again.

* * * * *